(12) United States Patent
Ishino et al.

(10) Patent No.: US 6,391,990 B1
(45) Date of Patent: May 21, 2002

(54) METHOD OF PRODUCING CONJUGATED DIENE POLYMER

(75) Inventors: Yoshiki Ishino; Satoshi Nakayama; Yoshihiro Mori; Iwakazu Hattori, all of Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/496,642

(22) Filed: Feb. 3, 2000

(30) Foreign Application Priority Data

Feb. 3, 1999 (JP) .......................................... 11-026740

(51) Int. Cl.$^7$ .................................................. C08F 4/44
(52) U.S. Cl. ........................ 526/143; 526/164; 526/335; 526/336; 526/337; 526/338; 526/339; 526/340
(58) Field of Search .................................. 526/143, 164

(56) References Cited

FOREIGN PATENT DOCUMENTS

EP  863165 A1  9/1998

*Primary Examiner*—Bernard Lipman
(74) *Attorney, Agent, or Firm*—Sughrue Mion, PLLC

(57) ABSTRACT

A conjugated diene polymer is produced by continuously polymerizing a conjugated diene monomer with a catalyst consisting essentially of components (1): a lanthanoid compound, (2): an aluminoxane and (3): a halogenated organometal compound, a halogenated metal compound or a halogenated organic compound in a hydrocarbon solvent containing 5–50% by weight of an aromatic hydrocarbon to obtain a conjugated diene polymer having a ratio (Mw/Mn) of weight average molecular weight (Mw) to number average molecular weight (Mn) of not more than 4.

5 Claims, No Drawings

METHOD OF PRODUCING CONJUGATED DIENE POLYMER

BACKGROUND OF THE INVENTION

1. Field of the Invention

This invention relates to a method of producing a conjugated diene polymer, and more particularly to a method of producing a conjugated diene polymer which can provide polymers having sufficiently controlled molecular weight and molecular weight distribution and excellent mechanical properties, thermal properties and the like by using a catalyst of a lanthanoid compound having a high polymerization activity and a hydrocarbon solvent containing an aromatic hydrocarbon as a polymerization solvent to control a polymerization rate and conduct continuous polymerization. Further, the invention relates to a method of producing a conjugated diene polymer capable of providing polymers having an excellent wear resistance, a reduced cold flow and the like by reacting and modifying the above obtained conjugated diene polymer with a particular compound.

2. Description of Related Art

Since the conjugated diene polymers play an industrially very important role, there have hitherto been proposed many proposals for a polymerization catalyst of a conjugated diene monomer in the production of the conjugated diene polymer. Particularly, many polymerization catalysts giving a high content of cis-1,4-bond have been developed for providing conjugated diene polymers having excellent mechanical and thermal properties. For example, there is well-known a composite catalyst system containing a compound of a transition metal such as nickel, cobalt, titanium or the like as an essential component. Among them, some catalysts have industrially and widely been used as a polymerization catalyst of butadiene, isoprene or the like (see End. Ing. Chem., 48, 784(1956) and JP-B-37-8198).

On the other hand, in order to obtain polymers having a higher content of cis-1,4-bond, there has been studied and developed a high stereospecific polymerization using a composite catalyst system comprising a rare earth metal compound and an organometal compound of an element of Group I–III and having a higher activity (Makromol. Chem. Suppl., 4, 61 (1981), J. Polym. Sci. Polym. Chem. Ed., 18, 3345 (1980), German Patent Application No. 2,848,964, Sci. Sinica., 23, 734 (1980), Rubber Chem. Technol., 68, 117 (1985) and the like).

Among these catalyst systems, it has been confirmed that a composite catalyst containing a neodymium compound and an organoaluminum compound as an essential component has an excellent polymerization activity and provides a polymer having a high content of cis-1,4-bond, which has already been industrialized as a polymerization catalyst for butadiene or the like (Macromolecules, 15, 230 (1982), Makromol. Chem., 94, 119 (1981) and the like). However, the demand for high polymer materials in market is more increasing with the advance of recent industrial technique and hence it is required to develop conjugated diene polymers having excellent mechanical properties such as wear resistance and the like and thermal properties such as thermal stability and the like.

In order to solve the above problem, there are made studies with respect to a polymerization method capable of providing polymers having a narrow molecular weight distribution by using a catalyst having a further higher activity. For example, it is reported that the polymerization activity becomes high when using a two-component catalyst system consisting of a neodymium compound and methylaluminoxane (Polymer Communication, 32, No. 17, p514 (1991) and the like). And also, it is reported that a catalyst system obtained by adding an organoaluminum compound and/or Lewis acid to the system of the neodymium compound and aluminoxane is high in the polymerization activity and provides a conjugated diene polymer having a narrow molecular weight distribution (JP-A-6-211916, JP-A-6-306113, JP-A-8-73515 and the like). However, when using these catalysts, the resulting polymer is generally a straight chain polymer being less in the branched structure, so that it is difficult to mix such a polymer with another high polymer material such as rubber or various fillers, or there is a problem in the processability and the cold flow becomes large to cause a problem in the storage and transportation.

In JP-A-63-178102, JP-A-630297403, JP-A-63-305101, JP-A-5-51406, JP-A-5-59103 and the like is report that the conjugated diene monomer is polymerized by using the catalyst system of neodymium compound and organoaluminum compound and reacted with a particular compound as a modifying agent to provide a polymer having an improved processability. In this catalyst system, however, the polymerization activity can not be said to be a sufficiently satisfactory high level.

DESCRIPTION OF THE INVENTION

It is an object of the invention to provide a method of producing a conjugated diene polymer having a narrow molecular weight distribution and excellent mechanical and thermal properties by using a catalyst system comprising a lanthanoid compound and aluminoxane and having a high polymerization activity and a polymerization solvent including an aromatic hydrocarbon to conduct continuous polymerization while controlling a polymerization rate.

It is another object of the invention to provide a method of producing a conjugated diene polymer capable of reacting the above obtained polymer with a particular compound to provide conjugated diene polymer having further excellent mechanical properties such as wear resistance and the like and reducing cold flow or the like to facilitate storage, transportation and the like.

According to the invention, there is the provision of a method of producing a conjugated diene polymer which comprises continuously polymerizing a conjugated diene monomer with a catalyst consisting essentially of the following components (1) to (3) in a hydrocarbon solvent containing 5–50% by weight of an aromatic hydrocarbon to obtain a conjugated diene polymer having a ratio (Mw/Mn) of weight average molecular weight (Mw) to number average molecular weight (Mn) of not more than 4:

Component (1): a lanthanoid compound;

Component (2): an aluminoxane; and

Component (3): a halogenated organometal compound, a halogenated metal compound or a halogenated organic compound having at least one of chlorine atom, bromine atom and iodine atom.

As the hydrocarbon solvent, use may be made of a saturated alicyclic hydrocarbon such as cyclopentane, cyclohexane or the like; a saturated aliphatic hydrocarbon such as butane, pentane, hexane, heptane or the like; and so on. And also, the hydrocarbon solvent contains 5~50% by weight, preferably 10~40% by weight, more particularly 15~35% by weight of the aromatic hydrocarbon. As the aromatic hydrocarbon, use may be made of toluene, xylene, benzene and so on. Particularly, toluene is preferable because it is low in the solidification point and can be used even at a low temperature and hardly remains in the resulting polymer.

When the amount of the aromatic hydrocarbon is less than 5% by weight, the polymerization rate can not sufficiently be controlled, while when it exceeds 50% by weight, the polymerization rate is too small.

As the conjugated diene monomer, mention may be made of 1,3-butadiene, isoprene, 2,3-dimethyl-1,3-butadiene, 1,3-pentadiene, 1,3-hexadiene, cyclo-1,3-pentadiene and so on. Particularly, polymer made from 1,3-butadiene and isoprene is useful. These conjugated diene monomers may be used alone or in admixture of two or more monomers. When two or more monomers are used, a copolymer is obtained.

The production of the conjugated diene polymer according to the first aspect of the invention is carried out by the continuous polymerization. The term "continuous polymerization" used herein means that the catalyst is always fed into the reaction system and is existent at an active state. The concentration of the catalyst is not particularly restricted because the molecular weight distribution and the like of the resulting polymer can be controlled even at the high concentration or low concentration. And also, the continuous polymerization may be carried out by a single reactor but also plural reactors, but it is favorable to conduct the continuous polymerization by using two or more reactors, usually 2~5 reactors. The use of plural reactors is favorable because the productivity is high and the temperature rise based on the polymerization heat is controlled. On the other hand, when the polymerization is carried out in a batch system, the catalyst is deactivated at a last reaction stage and hence the molecular weight and molecular weight distribution can not be controlled.

The temperature of the continuous polymerization is usually −30° C.~150° C., preferably 0~120° C., more particularly 40~100° C. And also, the weight ratio of monomer to polymerization solvent is usually 2~10, preferably 3~8, more particularly 4~6. Moreover, it is necessary to sufficiently take care that a substance having a deactivation action such as oxygen, water, carbon dioxide or the like is not incorporated into the reaction system.

In the continuous polymerization according to the invention, it is preferable that a primary reaction rate constant is not more than 4. The primary reaction rate constant is preferably not more than 3.5, more particularly not more than 2.5. When the primary reaction rate constant exceeds 4, temperature excessively rises in the reaction system and the reaction rate can not be controlled, so that the molecular weight distribution of the resulting polymer becomes wide and the content of cis-1,4,-bond undesirably lowers.

The lanthanoid compound as the component (1) means a compound of a lanthanoid belonging to atomic numbers 57~71 in Periodic Table. As the lanthanoid compound, a reaction product with Lewis base may also be used. Compounds of neodymium, praseodymium, cerium, lanthanum, gadolinium and the like or a mixture thereof are favorable as the lanthanoid compound. Particularly, neodymium compound and a mixture containing neodymium compound are preferable. Further, carboxylate, alkoxide, β-diketone complex, phosphate or phosphite is favorable as the lanthanoid compound. Particularly, the carboxylate and phosphate, further the carboxylate are preferable.

As the carboxylate of lanthanoid, use may be made of compounds represented by a general formula of $(R^{21}—CO_2)_3L$. In this general formula, L is a lanthanoid, and $R^{21}$ is a hydrocarbon group having a carbon number of 1~20, preferably a saturated or unsaturated alkyl group. The hydrocarbon group is straight chain, branched chain or ring-shaped, wherein a carboxyl group is bonded to a primary, secondary or tertiary carbon atom. As the carboxylic acid, mention may be made of octanoic acid, 2-ethyl-hexanoic acid, oleic acid, stearic acid, benzoic acid, napthenic acid, versatic acid (trade name made by Shell Chemical Corporation, a carboxylic acid in which carboxyl group is bonded to a tertiary carbon atom) and the like. Among them, 2-ethyl-hexanoic acid, napthenic acid and versatic acid are preferable.

The alkoxide of lanthanoid has a general formula of $(R^{22}O)_3L$ (wherein L is a lanthanoid). As an example of alkoxy group represented by $R^{22}O$, mention may be made of 2-ethyl-hexylalkoxy group, oleylalkoxy group, stearylalkoxy group, phenoxy group, benzylalkoxy group and the like. Among them, 2-ethyl-hexylalkoxy group and benzylalkoxy group are preferable.

As the β-diketone complex of lanthanoid, mention may be made acetylacetone complex, benzoylacetone complex, propionitrile acetone complex, valerylacetone complex, ethylacetylacetone complex and the like. Among them, acetylacetone complex and ethylacetylacetone complex are preferable.

As the phosphate or phosphite of lanthanoid, mention may be made of bis(2-ethylhexyl) phosphate, bis(1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl) (p-nonylphenyl) phosphate, 2-ethylhexyl, mono-2-ethylhexyl phosphonate, 2-ethylhexyl, mono-p-nonylphenyl phosphonate, bis(2-ethylhexyl) phosphite, bis(1-methylheptyl) phosphite, bis(p-nonylphenyl) phosphite, (1-methylheptyl)(2-ethylhexyl) phosphite, (2-ethylhexyl)(p-nonylphenyl) phosphite and the like of the lanthanoid. Among them, bis(2-ethylhexyl) phosphate, bis(1-methylheptyl) phosphate, 2-ethylhexyl, mono-2-ethylhexyl phosphite and bis(2-ethylhexyl) phosphite are favorable.

Among the above lanthanoid compounds, phosphates of neodymium and carboxylates of neodymium are preferable, and carboxylates of neodymium such as neodymium 2-ethyl-hexanoate, neodymium versatate and the like are most preferable.

In order to easily solubilize the lanthanoid compound or stably store over a long time of period, a reaction product between the lanthanoid compound and Lewis base can be used as a lanthanoid compound. As Lewis base, mention may be made of acetylacetone, tetrahydrofuran, pyridine, N,N-dimethylformamide, thiophene, diphenyl ether, triethylamine, an organophosphorus compound, and a monovalent or bivalent alcohol. In this case, Lewis base is favorable to be reacted in an amount of 0~30 mole, particularly 1~10 mole per 1 mole of lanthanoid. Moreover, the lanthanoid compound and Lewis base may be supplied as a mixture and reacted, or mat be supplied as a previously reacted product.

The aluminoxane as a component (2) is a compound represented by the following general formula (13) or (14):

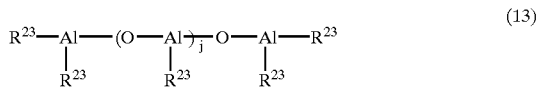

(13)

(14)

In the formula (13), $R^{23}$ is a hydrocarbon group having a carbon number of 1~20. In the formula (14), $R^{24}$ is at least one of methyl group, ethyl group, propyl group, butyl group, isobutyl group, t-butyl group, hexyl group, isohexyl group, octyl group, isooctyl group and the like. Among them, methyl group, ethyl group, isobutyl group and t-butyl group are favorable, and further methyl group is preferable. In the formulae (13) and (14), j is an integer of not less than 2, preferably 5~100.

As the aluminoxane, mention may be made of methylaluminoxane, ethylaluminoxane, n-propylaluminoxane, n-butylaluminoxane, isobutylaluminoxane and the like. Since the production of the aluminoxane is not particularly restricted, use may be made of all products produced by any well-known techniques. For example, an aluminoxane can be produced by adding trialkylaluminum or dialkylaluminum monochloride to an organic solvent such as benzene, toluene, xylene or the like and then adding and reacting water or a salt having water of crystallization such as copper sulfate pentahydrate, aluminum sulfate hexadecahydrate or the like thereto.

A halogen-containing metal compound as a component (3) is a halogenated organometal compound or a halogenated metal compound having at least one of chlorine atom, bromine atom and iodine atom, i.e. a compound containing a metallic element of Group II, III, IV, V, VI, VII or VIII in the Periodic Table and a halogen. As the halogen, chlorine and bromine are favorable.

As the halogenated organometal compound, mention may be made of ethyl magnesium iodide, ethyl magnesium chloride, ethyl magnesium bromide, n-propyl magnesium chloride, n-propyl magnesium bromide, isopropyl magnesium chloride, isopropyl magnesium bromide, n-butyl magnesium iodide, n-butyl magnesium chloride, n-butyl magnesium bromide, t-butyl magnesium chloride, t-butyl magnesium bromide, phenyl magnesium chloride, phenyl magnesium bromide and the like.

And also, mention may be made of methyl aluminum dichloride, methyl aluminum dibromide, ethyl aluminum dichloride, ethyl aluminum dibromide, butyl aluminum dichloride, butyl aluminum dibromide, dimethyl aluminum chloride, dimethyl aluminum bromide, diethyl aluminum iodide, diethyl aluminum chloride, diethyl aluminum bromide, dibutyl aluminum iodide, dibutyl aluminum chloride, dibutyl aluminum bromide, methyl aluminum sesquichloride, methyl aluminum sesquibromide, ethyl aluminum sesquichloride, ethyl aluminum sesquibromide, dibutyl tin dichloride, aluminum triiodide, aluminum trichloride, aluminum tribromide and the like.

Among these halogen-containing organometal compounds, diethyl aluminum chloride, ethyl aluminum sesquichloride, ethyl aluminum dichloride, diethyl aluminum bromide, ethyl aluminum sesquibromide and ethyl aluminum dibromide are favorable.

As the halogenated metal compound, mention may be made of magnesium chloride, zinc chloride, calcium chloride, antimony trichloride, antimony pentachloride, phosphorus triiodide, phosphorus trichloride, phosphorus tribromide, tin tetrachloride, tin tetrabromide, titanium tetraiodide, titanium tetrachloride, tungsten hexachloride, magnesium (II) iodide anhydride, pentacarbonyl manganese bromide, manganese (II) perchlorate hexahydrate, manganese (II) chloride anhydride, manganese (II) chloride tetrahydrate, manganese (II) bromide anhydride, manganese (II) bromide tetrahydrate, pentacarbonyl rhenium chloride, pentacarbonyl rhenium bromide, rhenium (III) chloride, rhenium (V) chloride and the like. And also, products obtained by reacting such a halogenated metal compound with a phosphorus compound, a carbonyl compound, a nitrogen compound, an ether compound or a Lewis base such as an alcohol or the like may be used.

As the halogen-containing organic compound in the component (3), a halogenated organic compound having a high reactivity with a base is particularly favorable. As such a compound, mention may be made of organochlorinated compounds such as benzoyl chloride, xylene dichloride, propionyl chloride, benzyl chloride, benzylidene chloride, t-butyl chloride, chlorodiphenyl methane, chlorotriphenyl methane, methyl chloroformate and the like; organobrominated compounds such as xylene dibromide, benzoyl bromide, propionyl bromide, benzyl bromide, benzylidene bromide, t-butyl bromide, methyl bromoformate and the like; and organiiodine compounds such as benzoyl iodide, xylilene diiodide and the like.

In the invention, conjugated diene polymers having a molecular weight distribution (Mw/Mn) of not more than 4, preferably not more than 3, more particularly not more than 2.5 and an adequate Mooney viscosity and a content of cis-1,4-bond of not less than 90%, preferably not less than 93% can be obtained by using the catalyst mainly composed of the components (1)~(3). When Mw/Mn of the polymer exceeds 4, or when the content of cis-1,4-bond is less than 90%, it undesirably tends to degrade the wear resistance of the resulting polymer.

According to the invention, the molecular weight and molecular weight distribution of the polymer can surely be controlled to preferable ranges by using a molecular weight adjusting agent together with t he catalyst components (1), (2) and (3). In case of the continuous polymerization using plural reactors, the molecular weight adjusting agent is added to the reaction system at a last-stage reactor or at a last reaction stage, whereby the molecular weight and molecular weight distribution can be controlled more efficiently.

As the molecular weight adjusting agent, use may be made of an organoaluminum compound represented by a general formula of H—Al—$R^{25}R^{26}$ (wherein $R^{25}$ and $R^{26}$ may be the same or different and are hydrogen atom or hydrocarbon group having a carbon number of 1~10). As the organoaluminum compound, mention may be made of dimethylaluminum hydride, diethylaluminum hydride, di-n-propylaluminum hydride, diisopropylaluminum hydride, di0n-butylaluminum hydride, diisobutylaluminum hydride, di-t-butylaluminum hydride, dipentylaluminum hydride, dihexylaluminum hydride, dicyclohexylaluminum hydride, dioctylaluminum hydride and the like. Among these compounds, diethylaluminum hydride, diisobutylaluminum hydride and the like are preferable.

And also, hydrogen, and a silane compound such as trimethyl silane, triethyl silane, tributyl silane, trihexyl silane, diemthyl silane, diethyl silane, dibutyl silane, dihexyl silane or the like may be mentioned as the molecular weight adjusting agent. The organoaluminum compounds or silane compounds may be used alone or in a combination of two or more compounds. Further, the organoaluminum compound and the silane compound may simultaneously be used. Moreover, the molecular weight adjusting agent mat be added to each component constituting the catalyst, or may be added to the reactor alone, or these methods may be used together.

In case of using two or more reactors, not more than 50% by weight in total amount of the molecular weight adjusting agent may be continuously added to any one on and after second reactors, or may simultaneously be added to plural reactors on and after second reactors.

The amounts of the components (1)~(3) constituting the catalyst and the molecular weight adjusting agent can properly be adjusted within a range capable of providing a polymer having required properties.

The amount of the component (1) is 0.0001~1.0 mmol per 100 g of the conjugated diene monomer. When the amount is less than 0.0001 mmol, the polymerization activity undesirably lowers, while when it exceeds 1.0 mmol, the catalyst concentration becomes undesirably high and the step of removing ash is required. Preferably, the component (1) is used in an amount of 0.0005–1.0 mmol.

And also, a molar ratio of component (1) to component (3) is 1/0.1~15, preferably 1/0.5~5, more particularly 1/0.8~2. Furthermore, the amount of the component (2) used can be represented by a molar ratio of Al to the component (1). The molar ratio of component (1) to component (2) is 1/1~150, preferably 1/5~80. Moreover, a molar ratio of component (1) to molecular weight adjusting agent is 1/1~500, preferably 1/10~300. In addition, a molar ratio of conjugated diene monomer to molecular weight adjusting agent is 1/100~5000, preferably 1/1000~3000. When the amounts used and component ratios are outside the above ranges, the catalyst activity tends to lower or it is undesirably required to take a step for removing the catalyst residue.

In addition to the above components (1), (2) and (3) and the molecular weight adjusting agent, a conjugated diene monomer and/or a non-conjugated diene compound may be added in an amount of 0–500 mol per 1 mol of the component (1), if necessary. As the conjugated diene compound used in the production of the catalyst, use may be made of the same monomer as used in the polymerization such as 1,3-butadiene, isoprene and the like. As the non-conjugated diene compound, mention may be made of divinylbenzene, diisopropenyl benzene, triisopropenyl benzene, 1,4-vinylhexadiene, ethylidene norbornene and the like. The conjugated diene compound as a catalyst component is not essential, but provides a merit of more improving the catalyst activity when it is used together with the components (1)–(3).

The catalyst according to the invention may be prepared by reacting the components (1)–(3) dissolved in a solvent or further with the molecular weight adjusting agent and the conjugated diene compound and/or non-conjugated diene compound, if necessary. In this case, the addition order of these components is optional. It is favorable that these components are previously mixed and reacted and then maturated from a viewpoint of the improvement of polymerization activity and the shortening of polymerization induction period. The maturating temperature is 0–100° C., preferably 20–80° C. When the temperature is lower than 0° C., the sufficient maturation is not conducted, while when it exceeds 100° C., the catalyst activity lowers and the broadening of molecular weight distribution is undesirably caused. The maturating time is not particularly restricted, but is usually not less than 0.5 minute. The maturation may be conducted by contacting the components with each other in a line before the addition to a polymerization reaction vessel and is stable over several days.

In the invention, a novel conjugated diene polymer having an increased molecular weight or a branched polymer chain can be further formed by continuously polymerizing the conjugated diene monomer with the lanthanoid compound catalyst in the hydrocarbon solvent containing the aromatic hydrocarbon and then adding a compound having a specified functional group selected from the group consisting of the following components (a)–(g) to react and modify an active terminal of the unmodified polymer. By such a modification are improved the mechanical properties such as wear resistance and the like, and cold flow of the polymer.

The component (a) is a halogenated organometal compound or a halogenated metal compound represented by a general formula (1) of $R^1{}_n MX_{a-n}$ (wherein $R^1$ is a hydrocarbon group having a carbon number of 1–20 and may have an ester group as a side chain, M is a tin atom, a silicon atom, a germanium atom or a phosphorus atom, X is a halogen atom, and a is a valence of M, and (a−n) is an integer of not less than 1, provided that n may be zero).

When M in the formula (1) is a tin atom, the component (a) includes triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride, tin tetrachloride and the like.

When M is a silicon atom, the component (a) includes triphenyl chlorosilane, trihexyl chlorosilane, trioctyl chlorosilane, tributyl chlorosilane, trimethyl chlorosilane, diphenyl dichlorosilane, dihexyl dichlorosilane, dioctyl dichlorosilane, dibutyl dichlorosilane, dimethyl dichlorosilane, methyl dichlorosilane, phenyl chlorosilane, hexyl trichlorosilane, octyl trichlorosilane, butyl trichlorosilane, methyl trichlorosilane, silicon tetrachloride and the like.

When M is a germanium atom, the component (a) includes triphenylgermanium chloride, dibutylgermanium dichloride, diphenylgermanium dichloride, butylgermanium trichloride, germanium tetrachloride and the like.

When M is a phosphorus atom, the component (a) includes phosphorus trichloride and the like.

As the component (a), use may be also made of an organometal compound containing ester group in its molecule shown by a general formula (2) of $R^2{}_n M(R^3{-}COOR^4)_{a-n}$ (wherein $R^2$, $R^3$ and $R^4$ are the same or different and are a hydrocarbon group having a carbon number of 1–20 and may contain an ester group in its side chain, M is a tin atom, a silicon atom, a germanium atom or a phosphorus atom, and a is a valence of M, and (a−n) is an integer of not less than 1, provided that n may be zero).

As the component (a), the above compounds may be used by combining them in an arbitrary ratio.

The component (b) is a heterocumulene compound having a chemical structure (Y=C=Z) in its molecule (wherein Y is a carbon atom, an oxygen atom, a nitrogen atom or a sulfur atom, and Z is an oxygen atom, a nitrogen atom or a sulfur atom).

In the above chemical structure, the component (b) is a ketene compound when Y is a carbon atom and Z is an oxygen atom, and a thioketene compound when Y is a carbon atom and Z is a sulfur atom, an isocyanate compound when Y is a nitrogen atom and Z is an oxygen atom, a thioisocyanate compound when Y is a nitrogen atom and Z is a sulfur atom, a carbodiimide compound when both Y and Z are nitrogen atoms, carbon dioxide when both Y and Z are oxygen atoms, a carbonyl sulfide when Y is an oxygen atom and Z is a sulfur atom, or carbon disulfide when both Y and Z are sulfur atoms. However, the component (b) is not limited to these combinations.

As the ketene compound, mention may be made of ethylketene, butylketene, phenylketene, toluylthioketene and the like.

As the thioketene compound, mention may be made of ethylene thioketene, butylthioketene, phenylthioketene, toluylthioketene and the like.

As the isocyanate compound, mention may be made of phenyl socyanate, 2,4-tolylene diisocyanate, 2,6-tolylene diisocyanate, diphenylmethane diisocyanate, polymeric type diphenylmethane diisocyanate, hexamethylene diisocyanate and the like.

As the thioisocyanate compound, mention may be made of phenyl thioisocyanate, 2,4-tolylene dithioisocyanate, hexamethylene dithioisocyanate and the like.

As the carbodiimide compound, mention may be made of N,N'-diphenylcarbodiimide, N,N'-ethylcarbodiimide and the like.

The component (c) is a hetero three-membered compound having a chemical structure shown by the following general formula (3):

     (3)

(wherein Y' is an oxygen atom, a nitrogen atom or a sulfur atom).

In the formula (3), the component (c) is an epoxy compound when Y' is an oxygen atom, an ethyleneimine compound when Y' is a nitrogen atom, or a thiirane compound when Y' is a sulfur atom.

As the epoxy compound, mention may be made of ethylene oxide, propylene oxide, cyclohexene oxide, styrene oxide, epoxidated soybean oil, epoxidated natural rubber, butyl glycidyl ether, phenyl glycidyl ether, 2-ethylhexyl glycidyl ether, allyl glycidyl ether, ethylene glycol diglycidyl ether, neopentylglycol diglycidyl ether, trimethylol propane polyglycidyl ether, glycerol polyglycidyl ether, polypropylene glycol diglycidyl ether, polyethylene glycol diglycidyl ether, sorbitol polyglycidyl ether, glycidyl methacrylate, glycidyl acrylate, N,N-diglycidyl aniline, N,N-diglycidyl toluidine, N,N-glycidylglycidyloxy aniline, tertaglycidylamino diphenylmethane and the like.

As the ethyleneimine compound, mention may be made of ethyleneimine, propyleneimine, N-phenyl ethyleneimine, N-(β-cyanoethyl) ethyleneimine and the like.

As the thiirane compound, mention may be made of thiirane, methyl thiirane, phenyl thiirane and the like.

The component (d) is a halogenated isocyano compound having a chemical structure (—N=C—X bond) (wherein X is a halogen atom).

As the halogenated isocyano compound, mention may be made of 2-amino-6-chloropyridine, 2,5-dibromopyridine, 4-chloro-2-phenyl quinazoline, 2,4,5-tribromo imidazole, 3,6-dichloro-4-methyl pyridazine, 3,4,5-trichloro pyridazine, 4-amino-6-chloro-2-mercapto pyrimidine, 2-amino-4-chloro-6-methyl pyrimidine, 2-amino-4,6-dichloro pyrimidine, 6-chloro-2,4-dimethoxy pyrimidine, 2-chloropyrimidine, 2,4-dichloro-6-methyl pyrimidine, 4,6-dichloro-2-(methylthio) pyrimidine, 2,4,5,6-tetrachloro pyrimidine, 2,4,6-trichloro pyrimidine, 2-amino-6-chloro pyrazine, 2,6-dichloro pyrazine, 2,4-bis(methylthio)-6-chloro-1,3,5-triazine, 2,4,6-trichloro-1,3,5-triazine, 2-bromo-5-nitrothiazole, 2-chlorobenzo thiazole, 2-chlorobenzo oxazole and the like.

The component (e) is a carboxylic acid, an acid halide, an ester compound, a carbonic ester compound or an acid anhydride having a chemical structure as shown by the following formulae (4)–(9):

$R^5$—(COOH)$_m$     (4)

$R^8$—(COX)$_m$     (5)

$R^7$—(COO—$R^8$)     (6)

$R^9$—OCOO—$R^{10}$     (7)

$R^{11}$—(COOCO—$R^{12}$)     (8)

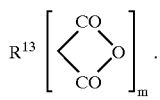     (9)

(wherein $R^5$ to $R^{13}$ are the same or different and are a hydrocarbon group having a carbon number of 1–50, X is a halogen atom, and m is an integer of 1–5).

As the carboxylic acid, mention may be made of acetic acid, stearic acid, adipic acid, maleic acid, benzoic acid, acrylic acid, methacrylic acid, phthalic acid, isophthalic acid, terephthalic acid, trimellitic acid, pyromellitic acid, mellitic acid, full or partial hydrate of polymethacrylic acid ester or polyacrylic acid ester and the like.

As the acid halide, mention may be made of acetic acid chloride, propionic acid chloride, butanoic acid chloride, isobutanoic acid chloride, octanoic acid chloride, acrylic acid chloride, benzoic acid chloride, stearic acid chloride, phthalic acid chloride, maleic acid chloride, oxalic acid chloride, acetyl iodide, benzoyl iodide, acetyl fluoride, benzoyl fluoride and the like.

As the ester compound, mention may be made of ethyl acetate, ethyl stearate, diethyl adipate, diethyl maleate, methyl benzoate, ethyl acrylate, ethyl methacrylate, diethyl phthalate, dimethyl terephthalate, tributyl trimellitate, tetraoctyl pyromellitate, hexaethyl mellitate, phenyl acetate, polymethyl methacrylate, polyethyl acrylate, polyisobutyl acrylate and the like.

As the carbonic ester compound, mention may be made of dimethyl carbonate, diethyl carbonate, dipropyl carbonate, dihexyl carbonate, diphenyl carbonate and the like.

As the acid anhydride, mention may be made of acetic anhydride, propionic anhydride, isobutyric anhydride, isovaleric anhydride, heptanoic anhydride, benzoic anhydride, cinnamic anhydride, succinic anhydride, methylsuccinic anhydride, maleic anhydride, glutaric anhydride, citraconic anhydride, phthalic anhydride, styrene-maleic anhydride copolymer and the like.

Moreover, the compound as the component (e) may contain a non-protonic polar group such as ether group, tertiary amino group or the like in its molecule within a range not damaging the properties of the resulting polymer. And also, the compounds as the component (e) may be used alone or in admixture of two or more compounds. Further, the component (e) may contain a compound having free alcohol group or phenyl group as an impurity.

The component (f) is a compound shown by the formulae (10)–(12):

$R^{14}{}_1M'(OCOR^{15})_{4-1}$     (10)

$R^{16}{}_1M'(OCO—R^{17}—COOR^{18})$     (11)

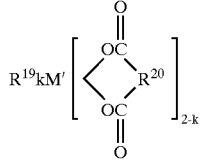     (12)

(wherein $R^{14}$ to $R^{20}$ are the same or different and are a hydrocarbon group having a carbon number of 1–20, M' is a tin atom, a silicon atom or a germanium atom, and l is an integer of 0–3 and k is 0 or 1).

As the compound shown by the formula (10), mention may be made of triphenyltin laurate, triphenyltin-2- ethylhexatate, triphenyltin naphthenate, triphenyltin acetate, triphenyltin acrylate, tri-n-butyltin laurate, tri-n-butyltin-2-ethylhexatate, tri-n-butyltin naphthenate, tri-n-butyltin acetate, tri-n-butyltin acrylate, tri-t-butyltin laurate, tri-t-butyltin-2-ethylhexatate, tri-t-butyltin naphthenate, tri-t-butyltin acetate, tri-t-butyltin acrylate, tri-isobutyltin laurate, tri-isobutyltin-2-ethylhexatate, tri-isobutyltin naphthenate, tri-isobutyltin acetate, tri-isobutyltin acrylate, tri-isopropyltin laurate, tri-ispropyltin-2-ethylhexatate, tri-isopropyltin napthenate, tri-isopropyltin acetate, tri-isopropyltin acrylate, trihexyltin laurate, trihexyltin-2-ethylhexatate, trihexyltin acetate, trihexyltin acrylate, trioctyltin laurate, trioctyltin-2-ethylhexatate, trioctyltin napthenate, trioctyltin acetate, trioctyltin acrylate, tri-2-ethylhexyltin laurate, tri-2-ethylhexyltin-2-ethylhexatate, tri-2ethylhexyltin naphthenate, tri-2-ethylhexyltin acetate, tri-2-ethylhexyltin acrylate, tristearyltin laurate, tristearyltin-2-ethylhexatate, tristearyltin naphthenate, tristearyltin acetate, tristearyltin acrylate, tribenzyltin laurate, tribenzyltin-2-ethylhexatate, tribenzyltin naphthenate, tribenzyltin acetate, tribenzyltin acrylate, diphenyltin dilaurate, diphenyltin-di-2-ethylhexatate, diphenyltin distearate, diphenyltin dinaphthenate, diphenyltin diacetate, diphenyltin diacrylate, di-n-butyltin dilaurate, di-n-butyltin-di-2-ethylhexatate, di-n-butyltin distearate, di-n-butyltin dinaphthenate, di-n-butyltin diacetate, di-n-butyltin diacrylate, di-t-butyltin dilaurate, di-t-butyltin-di-2-ethylhexatate, di-t-butyltin distearate, di-t-butyltin dinaphthenate, di-t-butyltin diacetate, di-t-butyltin diacrylate, di-isobutyltin dilaurate, di-isobutyltin-di-2-ethylhaxatate, di-isobutyltin distearate, di-isobutyltin dinaphthenate, di-isobutylfin diacetate, di-isobutyltin diacrylate, di-isopropyltin dilaurate, di-isopropyltin-di-2-ethylhexatate, di-isopropyltin distearate, di-isopropyltin dinaphthenate, di-isopropyltin diacetate, di-isopropyltin diacrylate, dihexyltin dilaurate, dihexyltin-di-2-ethylhexatate, dihexyltin distearate, dihexyltin dinaphthenate, dihexyltin diacetate, dihexyltin diacrylate, di-2-ethylhexyltin dilaurate, di-2-ethylhexyltin-di-2-ethylhexatate, di-2-ethylhexyltin distearate, di-2-ethylhexyltin dinaphthenate, di-2-ethylhexyltin diacetate, di-2-ethylhexyltin diacrylate, dioctyltin dilaurate, dioctyltin-di-2-ethylhexatate, dioctyltin distearate, dioctyltin dinaphthenate, dioctyltin diacetate, dioctyltin diacrylate, distearyltin dilaurate, distearyltin-di-2-ethylhexatate, distearyltin distearate, distearyltin dinaphthenate, distearyltin diacetate, distearyltin diacrylate, dibenzyltin dilaurate, dibenzyltin-di-2-ethylhexatate, dibenzyltin distearate, dibenzyltin dinaphthenate, dibenzyltin diacetate, dibenzyltin diacrylate, phenyltin trilaurate, phenyltin-tri-2-ethylhexatate, phenyltin trinaphthenate, phenyltin triacetate, phenyltin triacrylate, n-butyltin trilaurate, n-butyltin-tri-2-ethylhexatate, n-butyltin trinaphthenate, n-butyltin triacetate, n-butyltin triacrylate, t-butyltin triluarate, t-butyltin-tri-2-ethylhexylhexatate, t-butyltin trinaphthenate, t-butyltin triacetate, t-butyltin triacrylate, isobutyltin trilaurate, isobutyltin-2-ethylhexylhexatate, isobutyltin trinaphthenate, isobutyltin triacetate, isobutyltin triacrylate, isopropyltin trilaurate, isopropyltin-2-ethylhexylhexatate, isopropyltin trinaphthenate, isopropyltin triacetate, isopropyltin triacrylate, hexyltin trilaurae, hexyltin-tri-2-ethylhexylhexatate, hexyltin trinaphthenate, hexyltin triacetate, hexyltin triacrylate, octyltin trilaurate, octyltin-2-ethylhexylhexatate, octyltin trinaphthenate, octyltin triacetate, octyltin triacrylate, 2-ethylhexyltin trilaurate, 2-ethylhexyltin-tri-2-ethylhexylhexatate, 2-ethylhexyltin trinaphthenate, 2-ethylhexyltin triacetate, 2-ethylhexyltin triacrylate, stearyltin trilaurate, stearyltin-tri-2-ethylhexylhexatate, stearyltin trinaphthenate, stearyltin triacetate, stearyltin triacrylate, benzyltin trilaurate, benzyltin-tri-2-ethylhexylhexatate, benzyltin trinapthenate, benzyltin triacetate, benzyltin triacrylate and the like.

As the compound shown by the formula (11), mention may be made of diphenyltin bismethylmaleate, diphenyltin-bis-2-ethylhexylmaleate, diphenyltin bisoctylmaleate, diphenyltin bisbenzylmaleate, di-n-butyltin bismethylmaleate, di-n-butyltin-bis-2-ethylhexylmaleate, di-n-butyltin bisoctylmaleate, di-n-butyltin bisbenzylmaleate, di-t-butyltin bismethylmaleate, di-t-butyltin-bis-2-ethylhexylmaleate, di-t-butyltin bisoctylmaleate, di-t-butyltin bisbenzylmaleate, di-isobutyltin bismethylmaleate, di-isobutyltin-bis-2-ethylhexylmaleate, di-isobutyltin bisoctylmaleate, di-isobutyltin bisbenzylmaleate, di-isopropyltin bismethylmaleate, di-isopropyltin-bis-2-ethylhexylmaleate, di-isopropyltin bisoctylmaleate, di-isopropyltin bisbenzylmaleate, dihexyltin bismethylmaleate, dihexyltin-bis-2-ethylhexylmaleate, dihexyltin bisoctylmaleate, dihexyltin bisbenzylmaleate, di-2-ethylhexyltin bismethylmaleate, di-2-ethylhexyltin-bis-2-ethylhexylmaleate, di-2-ethylhexyltin bisoctylmaleate, di-2-ethylhexyltin bisbenzylmaleate, dioctyltin bismethylmaleate, dioctyltin-bis-2-ethylhexylmaleate, dioctyltin bisoctylmaleate, dioctyltin bisbenzylmaleate, distearyltin bismethylmaleate, distearyltin-bis-2-ethylhexylmaleate, distearyltin bisoctylmaleate, distearyltin bisbenzylmaleate, dibenzyltin bismethylmaleate, dibenzyltin-bis-2-ethylhexylmaleate, dibenzyltin bisoctylmaleate, dibenzyltin bisbenzylmaleate, diphenyltin bismethyladipate, diphenyltin-bis-2-ethylhexyladipate, diphenyltin bisoctyladipate, diphenyltin bisbenzyladipate, di-n-butyltin bismethyladipate, di-n-butyltin-bis-2-ethylhexyladipate, di-n-butyltin bisoctyladipate, di-n-butyltin bisbenzyladipate, di-t-butyltin bismethyladipate, di-t-butyltin-bis-2-ethylhexyladipate, di-t-butyltin bisoctyladipate, di-t-butyltin bisbenzyladipate, di-isobutyltin bismethyladipate, di-isobutyltin-bis-2-ethylhexyladipate, di-isobutyltin bisoctyladipate, di-isobutyltin bisbenzyladipate, di-isopropyltin bismethyladipate, di-isopropyltin-bis-2-ethylhexyladipate, di-isopropyltin bisoctyladipate, di-isopropyltin bisbenzyladipate, dihexyltin bismethyladipate, dihexyltin-bis-2-ethylhexyladipate, dihexyltin bismethyladipate, dihexyltin bisbenzyladipate, di-2-ethylhexyltin bismethyladipate, di-2-ethylhexyltin-bis-2-ethylhexyladipate, di-2-ethylhexyltin bisoctyladipate, di-2-ethylheyxltin bisbenzyladipate, dioctyltin bismethyladipate, dioctyltin-bis-2-ethylhexyladipate, dioctyltin bisoctyladipate, dioctyltin bisbenzyladipate, distearyltin bismethyladipate, distearyltin-bis-2-ethylhexyladipate, distearyltin bisoctyladipate, distearyltin bisbenzyladipate, dibenzyltin bismethyladipate, dibenzyltin-bis-2-ethylhexyladipate, dibenzyltin bisoctyladipate, dibenzyltin bisbenzyladipate, derivatives of compounds each having two carboxylic groups such as malonic acid, malic acid, succinic acid and the like, and so on.

As the compound shown by the formula (12), mention may be made of diphenyltin maleate, di-n-butyltin maleate, di-t-butyltin maleate, di-isobutyltin maleate, di-isopropyltin maleate, dihexyltin maleate, di-2-ethylhexyltin maleate, dioctyltin maleate, distearyltin maleate, dibenzyltin maleate, dipheyltin adipate, di-n-butyltin adipate, di-t-butyltin adipate, di-isobutyltin adipate, di-isopropyltin adipate, dihexyltin adipate, di-2-ethylhexyltin adipate, dioctyltin adipate, distearyltin adipate, dibenzyltin adipate, derivatives of compounds each having two carboxylic groups such as malonic acid, malic acid, succinic acid and the like, and so on.

The component (g) is an alkoxysilane compound having at least one epoxy group and/or isocyanate group in its molecule.

As the alkoxysilane compound, mention may be made of epoxy group-containing alkoxysilane compounds such as 3-glycidyloxypropyl trimethoxysilane, 3-glycidyloxypropyl triethoxysilane, 3-glycidyloxypropyl triphenoxysilane, (3-glycidyloxypropyl) methyl dimethoxysilane, (3-glycidyloxypropyl) methyl diethoxysilane, (3-glycidyloxypropyl) methyl diphenoxysilane, condensate of (3-glycidyloxypropyl) methyl dimethoxysilane, condensate of (3-glycidyloxypropyl) methyl diethoxysilane, β-(3,4-epoxycyclohexyl) ethyl trimethoxysilane, condensate of 3-glycidyloxypropyl trimethoxysilane, condensate of 3-glycidyloxypropyl triethoxysilane and the like; and isocyanate group-containing alkoxysilane compounds such as 3-isocyanatopropyl trimethoxysilane, 3-isocyanatopropyl triethoxysilane, 3-isocyanatopropyl triphenoxysilane, (3-isocyanatopropyl) methyl dimethoxysilane, (3-isocyanatopropyl) methyl diethoxysilane, (3-isocyanatopropyl) methyl diphenoxysilane, condensate of (3-isocyanatopropyl) methyl dimethoxysilane, condensate of (3-isocyanatopropyl) methyl diethoxysilane, β-(3,4-isocyanatocyclohexyl) ethyl trimethoxysilane, condensate of (3-isocyanatopropyl) trimethoxysilane, condensate of (3-isocyanatopropyl) triethoxysilane and the like.

The components (a)–(g) (hereinafter referred to as a modifying agent) may be used alone or in admixture of two or more components.

The amount of the modifying agent used to the component (1) is 0.01~200, preferably 0.1~150 as a molar ratio. When the amount is less than 0.01, the modification effect becomes smaller and the properties such as wear resistance and cold flow are not sufficiently improved, while when it exceeds 200, the unreacted modifying agent remains and the effect of improving the properties is saturated.

It is desirable that the modification reaction is carried out at a temperature of not higher than 160° C., preferably −30° C.~+130° C. for 0.2–5 hours.

The method of adding the modifying agent is not particularly restricted unless the modifying agent is mixed with the polymer solution after the polymerization. For example, the modifying agent may be added to a pipe transporting the polymer solution and mixed in a line mixer, or may be mixed with the polymer solution in an agitating tank. Alternatively, these methods may be combined.

After the completion of the modification, an objective polymer can be recovered by adding a short-stop, a polymerization stabilizer or the like to the reaction system, if necessary, and conducting well-known solvent-removing and drying operations in the production of the conjugated diene polymer.

The conjugated diene polymer obtained after the modification has a Mw/Mn ratio of not more than 4, a cis-1,4-bond content of not less than 90%, preferably not less than 93% and a vinyl-1,2-bond content of not more than 3%, preferably not more than 1.5%. When the Mw/Mn ratio exceeds 4, the wear resistance becomes poor. When the cis-1,4-bond content is less than 90%, the wear resistance becomes also poor. And also, when the vinyl-1,2-bond content exceeds 3.0%, the durability becomes poor.

Furthermore, the modified conjugated diene polymer is favorable to have a Mooney viscosity at 100° C. ($ML_{1+4}$, 100° C.) of 10~150, preferably 10~100, more particularly 15~70. When the Mooney viscosity is less than 10, the wear resistance after vulcanization becomes poor, while when it exceeds 150, the processability in the kneading becomes poor.

Moreover, the weight-average molecular weight (Mw) in terms of polystyrene is usually 100,000–1,500,000, preferably 150,000–1,000,000. When Mw is outside the above range, the processability and vulcanization properties become undesirably poor.

The thus obtained polymer can be recovered by solvent-removing and drying operations after a process oil such as aromatic oil, naphthenic oil or the like is added in an amount of 5–100 parts by weight based on 100 parts by weight of the polymer prior to the removal of the solvent, if necessary.

The conjugated diene polymer(s) according to the invention is used in wide applications requiring mechanical properties such as wear resistance and the like such as tread, sidewall and so on in tires for passenger car, truck and bus and winter-season tires such as studless tire or the like, various rubber members, hoses, belts, vibration damping rubbers, various industrial goods and the like by using the polymer alone or blending with another synthetic rubber or natural rubber, extending with a process oil, if necessary, and adding with a filler such as carbon black or the like, a vulcanizing agent, a vulcanization accelerator and the other usual additives and then vulcanizing them. As the synthetic rubber, use may be made of emulsion-polymerized SBR, solution-polymerized SBR, polyisoprene, EPM, EPDM, butyl rubber, hydrogenated BR, hydrogenated SBR and the like.

The following examples are given in illustration of the invention and are not intended as limitations thereof.

In these examples, % is by weight otherwise specified. Moreover, the primary reaction rate constant and final reaction ratio are calculated by the following methods. And also, Mw/Mn and Mooney viscosity are measured by the following methods.

Primary Reaction Rate Constant (/hour)

Assuming that the reaction rate of the monomer is proportional to a primary of monomer concentration, $-dC/dt=kC$, so that it is calculated according to the following equation from mass balance:

In case of batch polymerization, $\ln(C_{A0}/C_A)=kt$ $C_{A0}$: initial monomer concentration $C_A$: monomer concentration after reaction k: primary reaction rate constant (/hour)

t: reaction time (hour)

In case of continuous polymerization, $C_{A(n-1)}/C_{An}=1+k\theta$ $C_{A(n-1)}$: monomer concentration at inlet of reactor $C_{An}$: monomer concentration at outlet of reactor k: primary reaction rate constant (/hour)

θ: retaining time (hour)

Final Reaction Ratio

It is represented by amount of resulting polymer/initial monomer amount

Mw/Mn

The number average molecular weight (Mn) and weight average molecular weight (Mw) are measured by using the following apparatus under the following conditions, from which Mw/Mn is calculated.

Apparatus: Model "HLC-8120GPC", made by Toso Co., Ltd.

Detector: differential refractometer

Column: "Column GMHHXL", made by Toso Co., Ltd.

Mobile phase: tetrahydrofuran

Mooney Viscosity ($ML_{1+4}$, 100° C.)

It is measured at a temperature of 100° C. for a measuring time of 4 minutes after the preliminary heating for 1 minute.

EXAMPLES 1, 2

(1) Preparation of Catalyst Solution

To a mixed solution of neodymium versatate in cyclohexane/heptane is added 1,3-butadiene in an amount of 5 times an amount of neodymium as a molar ratio at room temperature with stirring. Thereafter, to this neodymium solution are added a solution of 10% methylaluminoxane in toluene (made by Albemar Corporation), diisobutyl aluminum hydride (made by Toso Aquzo Corporation) and a solution of equimolar amount of zinc chloride per neodymium in 2-ethylhexanol at room temperature in this order with stirring. Further, 1,3-butadiene is added to the mixed solution in an amount of 500 times to neodymium as a molar ratio at room temperature with stirring to conduct preliminary polymerization, whereby a catalyst solution is prepared.

(2) Continuous Polymerization of 1,3-butadiene

Into a reactor provided with a jacket of 20 liters in capacity is discharged a mixed solvent of cyclohexane and toluene as a polymerization solvent and a temperature is adjusted to 70° C. Thereafter, the catalyst solution prepared in the item (1), 1,3-butadiene and diisobutyl aluminum hydride are continuously supplied to conduct continuous polymerization of 1,3-butadiene. After the polymerization for a given time, a short-stop is added to stop the reaction and solvent removing and drying are carried out according to usual manner to obtain polybutadiene. Moreover, the average retaining time is 2 hours. And also, the weight ratio of cyclohexane to toluene, weight ratio of solvent to 1,3-butadiene, molar ratio of methylaluminoxane to neodymium versatate and molar ratio of 1,3-butadiene to neodymium versatate or diisobutyl aluminum hydride are shown in Table 1.

(3) Measurement of Properties

The primary reaction rate constant in the polymerization reaction of the item (2) is calculated by the aforementioned method. And also, Mw/Mn and Mooney viscosity of the obtained polybutadiene are measured by the aforementioned methods. The results are also shown in Table 1.

Comparative Example 1

The same procedure as in Example 2 is repeated except that batch polymerization is carried out by using an autoclave of 5 liters in capacity. And also, the primary reaction rate constant is calculated and the Mw/Mn and Mooney viscosity are measured by the same methods as in Example 1. The results are shown in Table 1.

Comparative Example 2

The polymerization of 1,3-butadiene is carried out in the same manner as in Example 2 except that only cyclohexane is used as a polymerization solvent and the average retaining time is 1 hour. In this reaction system, however, the reaction rate is large and the primary reaction rate constant is not less than 7 and also the reaction time can not be controlled.

Comparative Example 3

The polymerization of 1,3-butadiene is carried out in the same manner as in Example 1 except that methylaluminoxane is not used in the preparation of the catalyst solution. However, the monomer can not be polymerized in such a catalyst solution.

TABLE 1

|  | Example | | Comparative Example | | |
| --- | --- | --- | --- | --- | --- |
|  | 1 | 2 | 1 | 2 | 3 |
| Cyclohexane/toluene (weight ratio) | 8/2 | 8/2 | 8/2 | 10/0 | 8/2 |
| Solvent/monomer (weight ratio) | 5 | 5 | 5 | 5 | 5 |
| Average retaining time (reaction time in Comparative Example 1) (hr) | 2 | 2 | 2 | 1 | 2 |
| Methylaluminoxane/neodymium versatate (molar ratio) | 80 | 80 | 80 | 80 | — |
| 1.3-butadiene/neodymium versatate (molar ratio) | 150000 | 300000 | 300000 | 300000 | 150000 |
| 1,3-butadiene/diisobutyl aluminum hydride (molar ratio) | 1000 | 1000 | 1000 | 1000 | 1000 |
| Primary reaction rate constant (/hr) | 2.3 | 1.5 | 1.2 | ≧7 | no reaction |
| Mw/Mn | 2.2 | 2.4 | 4.2 | — | — |
| Mooney viscosity $ML_{1+4}$ (100° C.) | 20 | 25 | 50 | — | — |

As seen from Table 1, polybutadiene having a narrow molecular weight distribution and a proper Mooney viscosity is obtained in Examples 1 and 2. On the other hand, in Comparative Example 1 of the batch polymerization, the polymerization rate lowers and the molecular weight distribution becomes wide and the Mooney viscosity of the resulting polymer becomes large. In Comparative Example 2 using no toluene as a polymerization solvent, the polymerization rate becomes too large and the reaction temperature can not be controlled. In Comparative Example 3, the reaction is not caused in the catalyst containing no alumoxane.

EXAMPLES 3, 4

The same procedure as in Example 1 is repeated except that 1,3-butadiene and neodymium versatate or diisobutyl aluminum hydride are used in a molar ratio shown in Table 2 and continuous polymerization is carried out by using three reactors. The primary reaction state constant in the first reactor is calculated and further the Mw/Mn and Mooney viscosity are measured by the same methods as in Example 1. And also, the final reaction ratio is calculated by the aforementioned method. The results are shown in Table 2.

EXAMPLE 5

The same procedure as in Example 3 is repeated except that diisobutyl aluminum hydride is added to an outlet of the second reactor in an amount corresponding to 20% of the initial amount. And also, the primary reaction state constant in the first reactor is calculated and further the Mw/Mn and Mooney viscosity are measured by the same methods as in Example 1. Further, the final reaction ratio is calculated by the aforementioned method. The results are also shown in Table 2.

EXAMPLE 6

After the completion of the polymerization in Example 3, dioctyltin-2-ethylhexyl maleate is added in an amount of 40 times to neodymium as a molar ratio as a modifying agent to conduct modification at 70° C. for 10 minutes. The treatment of stopping the reaction is carried out in the same manner as in Example 1. And also, the primary reaction state constant in the first reactor is calculated and further the Mw/Mn and Mooney viscosity are measured by the same methods as in Example 1. Further, the final reaction ratio is calculated by the aforementioned method. The results are also shown in Table 2.

EXAMPLE 7

After the completion of the polymerization in Example 4, dioctyltin-2-ethylhexylbenzyl maleate is added in an amount of 10 times to neodymium as a molar ratio as a modifying agent to conduct modification at 70° C. for 10 minutes. The treatment of stopping the reaction is carried out in the same manner as in Example 1. And also, the primary reaction state constant in the first reactor is calculated and further the Mw/Mn and Mooney viscosity are measured by the same methods as in Example 1. Further, the final reaction ratio is calculated by the aforementioned method. The results are also shown in Table 2.

TABLE 2

|  | Example | | | | |
|---|---|---|---|---|---|
|  | 3 | 4 | 5 | 6 | 7 |
| Cyclohexane/toluene (weight ratio) | 8/2 | 8/2 | 8/2 | 8/2 | 8/2 |
| Solvent/monomer (weight ratio) | 5 | 5 | 5 | 5 | 5 |
| Average retaining time (hr) | 2 | 2 | 2 | 2 | 2 |
| Methylaluminoxane/neodymium versatate (molar ratio) | 80 | 20 | 80 | 80 | 20 |
| 1,3-butadiene/neodymium versatate (molar ratio) | 200000 | 75000 | 200000 | 200000 | 75000 |
| 1,3-butadiene/diisobutyl aluminum hydride (molar ratio) | 1200 | 1000 | 1200 (initial) | 1200 | 1000 |
| Primary reaction rate constant at first reactor (/hr) | 2.2 | 2.0 | 2.2 | 2.2 | 2.0 |
| Final reaction ratio (%) | 92 | 94 | 92 | 93 | 94 |
| Mw/Mn |  |  |  |  |  |
| before modification | 2.7 | 2.5 | 2.4 | 2.6 | 2.5 |
| after modification | — | — | — | 2.7 | 2.6 |
| Mooney viscosity $ML_{1+4}$ (100° C.) |  |  |  |  |  |
| before modification | 30 | 35 | 27 | 30 | 33 |
| after modification | — | — | — | 37 | 41 |

As seen from Table 2, polybutadiene having a narrow molecular weight distribution and a proper Mooney viscosity is obtained in Examples 3 and 4 polymerizing 1,3-butadiene in the same manner as in Example 1 except for the use of three reactors and Example 5 further adding the molecular weight adjusting agent at the outlet of the second reactor. Even in Examples 6 and 7 reacting with the modifying agent after the polymerization, polybutadiene having a sufficiently narrow molecular weight distribution and proper Mooney viscosity is obtained though there is a tendency that the molecular weight distribution becomes wide and the Mooney viscosity increases as compared with those of Examples 1–3.

EXAMPLE 8

The same procedure as in Example 1 is repeated except that 1,3-butadiene and neodymium versatate or diisobutyl aluminum hydride are used in a molar ratio shown in Table 3 and continuous polymerization is carried out at a reaction temperature shown in Table 3 by using two reactors.

3-glycidyloxypropyl trimethoxysilane as a modifying agent is added in a molar ratio of 40 to neodymium at an outlet of the second reactor, which are reacted in a third reactor at 70° C. for 1 hour to conduct modification. The treatment after the modification is carried out in the same manner as in Example 1. The results are also shown in Table 3.

EXAMPLE 9

The same procedure as in Example 1 is repeated except that 1,3-butadiene and neodymium versatate or diisobutyl aluminum hydride are used in a molar ratio shown in Table 3 and continuous polymerization is carried out at a reaction temperature shown in Table 3 by using two reactors.

Each of dioctyltin bisbenzyl maleate and 3-glycidyloxypropyl trimethoxysilane as a modifying agent is added in a molar ratio of 20 to neodymium at an outlet of the second reactor, which are reacted in a third reactor at 70° C. for 1 hour to conduct modification. The treatment after the modification is carried out in the same manner as in Example 1. The results are also shown in Table 3.

TABLE 3

|  | Example | |
|---|---|---|
|  | 8 | 9 |
| Cyclohexane/toluene (weight ratio) | 8/2 | 8/2 |
| Solvent/monomer (weight ratio) | 5 | 5 |
| Average retaining time (hr) | 1.5 | 2 |
| Methylaluminoxane/neodymium versatate (molar ratio) | 20 | 10 |
| 1,3-butadiene/neodymium versatate (molar ratio) | 180000 | 230000 |
| 1,3-butadiene/diisobutyl aluminum hydride (molar ratio) | 1050 | 1100 |
| Primary reaction rate constant at first reactor (/hr) | 2.0 | 1.8 |
| Final reaction ratio (%) | 92 | 93 |
| Mw/Mn |  |  |
| before modification | 2.4 | 2.5 |
| after modification | 2.6 | 2.7 |
| Mooney viscosity $ML_{1+4}$ (100° C.) |  |  |
| before modification | 32 | 32 |
| after modification | 44 | 46 |

According to the invention, conjugated diene polymers having a narrow molecular weight distribution and a proper Mooney viscosity can be provided by continuously polymerizing conjugated diene monomer with a lanthanoid compound catalyst in a polymerization solvent containing an aromatic hydrocarbon. And also, polymers having a narrower molecular weight distribution can be more surely obtained by using the molecular weight adjusting agent.

Furthermore, polymers having excellent wear resistance and the like and decreasing the cold flow can be provided by adding a modifying agent after the polymerization reaction to react an active terminal of the polymer molecule.

What is claimed is:

1. A method of producing a conjugated diene polymer which comprises continuously polymerizing a conjugated diene monomer with a catalyst consisting essentially of the following components (1) to (3) in a hydrocarbon solvent containing 5–50% by weight of an aromatic hydrocarbon to obtain a conjugated diene polymer having a ratio (Mw/Mn) of weight average molecular weight (Mw) to number average molecular weight (Mn) of not more than 4:

Component (1): a lanthanoid compound;

Component (2): an aluminoxane; and

Component (3): a halogenated organometal compound, a halogenated metal compound or a halogenated organic compound having at least one of chlorine atom, bromine atom and iodine atom.

2. The method according to claim 1, wherein said continuous polymerization has a primary reaction rate constant of not more than 4.

3. The method according to claim 1, wherein said continuous polymerization is carried out by further using a molecular weight adjusting agent.

4. The method according to claim 1, wherein at least one compound selected from the group consisting of the following components (a) to (g) is further reacted after said continuous polymerization:

Component (a): a compound represented by the following general formula (1) or (2):

  (1)

  (2)

(wherein $R^1$–$R^4$ are the same or different and are a hydrocarbon group having a carbon number of 1–20 and may have an ester group as a side chain, M is a tin atom, a silicon atom, a germanium atom or a phosphorus atom, X is a halogen atom, and a is a valence of M, and (a–n) is an integer of not less than 1, provided that n may be zero);

Component (b): a heterocumulene compound having a chemical structure (Y=C=Z) in its molecule (wherein Y is a carbon atom, an oxygen atom, a nitrogen atom or a sulfur atom, and Z is an oxygen atom, a nitrogen atom or a sulfur atom);

Component (c): a hetero three-membered compound having a chemical structure shown by the following general formula (3):

  (3)

(wherein Y' is an oxygen atom, a nitrogen atom or a sulfur atom);

Component (d): a halogenated isocyano compound having a chemical structure of —N=C—X bond in its molecule;

Component (e): a compound represented by the following general formula (4), (5), (6), (7), (8) or (9):

  (4)

  (5)

  (6)

  (7)

  (8)

  (9)

(wherein $R^5$ to $R^{13}$ are the same or different and are a hydrocarbon group having a carbon number of 1–50, X is a halogen atom, and m is an integer of 1–5);

Component (f): a compound represented by the following general formula (10), (11) or (12):

  (10)

  (11)

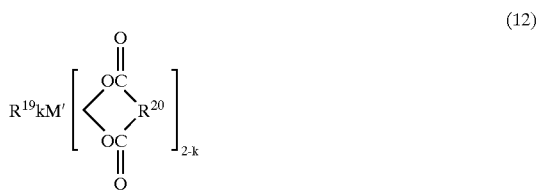  (12)

(wherein $R^{14}$ to $R^{20}$ are the same or different and are a hydrocarbon group having a carbon number of 1–20, M' is a tin atom, a silicon atom or a germanium atom, and l is an integer of 0–3 and k is 0 or 1); and Component (g): an alkoxysilane compound having at least one epoxy group and/or isocyanate group in its molecule.

5. The method according to claim 1, wherein said aromatic hydrocarbon is toluene.

* * * * *